United States Patent [19]

Hoffmeister et al.

[11] 4,445,859

[45] May 1, 1984

[54] DENTAL EQUIPMENT STAND

[75] Inventors: Jürgen Hoffmeister, Genova-Nervi; Guiseppe Ravasini, Parma, both of Italy; Franz-Xaver Boeckh, Schönebürg, Fed. Rep. of Germany

[73] Assignee: Kaltenbach & Voigt GmbH & Co., Biberach, Fed. Rep. of Germany

[21] Appl. No.: 351,431

[22] Filed: Feb. 23, 1982

[30] Foreign Application Priority Data

Mar. 9, 1981 [DE] Fed. Rep. of Germany ....... 3108826

[51] Int. Cl.[3] .............................................. A61C 19/00

[52] U.S. Cl. ......................................... 433/79; 433/77

[58] Field of Search ....................... 433/78, 27, 79, 77, 433/28; 312/303, 333, 306, 252, 234.1

[56] References Cited

U.S. PATENT DOCUMENTS

| | | | |
|---|---|---|---|
| 3,366,430 | 1/1968 | Diedrich | 312/209 |
| 4,026,026 | 5/1977 | Richardson | 433/77 |
| 4,138,815 | 2/1979 | Williams et al. | 433/77 |

*Primary Examiner*—Robert Peshock

*Attorney, Agent, or Firm*—Scully, Scott, Murphy & Presser

[57] ABSTRACT

A dental equipment stand which includes a mounting component on which there is horizontally linearly displaceable a holder carriage for dental instruments which are removably restrained in individual holders, and is thereby supported so as to be movable sideways out of the mounting equipment. The individual holders can be moved aside in such a manner that a free space is produced below the mounting component whereby the instruments which are arranged within the individual holders no longer stand in the way of the close movement of the front side of the mounting component against the mouth of the patient. After reaching of the displaced end position of the holder carriage which, as before, remains with a portion of its length within the sliding support of the mounting component, the separate carrier which includes the adjacent located individual holders can be displaced with respect to the holder carriage and thus removed so far from the mounting component that the instruments which are located in the individual holders are no longer located ahead of the front side of the mounting component but at the side thereof so that, when desired, either suitable movement of the treatment chair or through suitable movement of the mounting component, there can be optimally reduced the distance between the front side of the mounting component and the mouth of the patient. Thereby, particularly when the mounting component is formed by a dental repository table, for example, a medication or instrument tray, it is advantageous that it is possible to optimally shorten the extent of the movements of the hands of the dentist or the assistant.

15 Claims, 11 Drawing Figures

DENTAL EQUIPMENT STAND

BACKGROUND OF THE INVENTION

1. Field of the Invention

The present invention relates to a dental equipment stand which includes a mounting component on which there is horizontally linearly displaceable a holder carriage for dental instruments which are removably restrained in individual holders, and is thereby supported so as to be movable sideways out of the mounting component.

2. Discussion of the Prior Art

In known equipment stands of this type, the individual holders form a constructional unit which is displaceable in unison with the holder carriage which is formed either tubularly (Prospectus "ASDI ERGONOMI-program adec TRAY-TROL" of the firm AB SVENSKA DENTAL INSTRUMENT, German Petty Patent No. 75 32 413), or block-shaped (Propectus "The Aide 2" of the firm Guest Medical & Dental Products, Japanese Petty Patent No. 52-133 090). This will result in that the extent of the displacement of the holder carriage is limited since the displaced end position is determined in that the holder carriage must always remain with one portion of its length within the sliding support of the mounting component in order to prevent any detaching of the holder carriage from the mounting component and its falling down. Due to this reason, the instruments in the individual holders at the front side of the holder carriage which faces towards the patient present obstructions since they render it impossible that the distance between the front side of the mounting component and the mouth of the patient who is mostly lying can be reduced to almost zero, which would be quite desirable since, because of such a small distance, the extent of movement of the hand of the treating dentist or his assistant to the surface of the mounting component which is used as a repository surface can be shortened in an optimum manner.

SUMMARY OF THE INVENTION

The present invention has as an object the provision of a dental equipment stand of the above-mentioned type in which the individual holders can be moved aside in such a manner that a free space is produced below the mounting component whereby the instruments which are arranged within the individual holders no longer stand in the way of the close movement of the front side of the mounting component against the mouth of the patient.

The advantages which are achieved by means of the present invention can essentially be ascertained in that, after reaching of the displaced end position of the holder carriage which, as before, remains with a portion of its length within the sliding support of the mounting component. The separate carrier which includes the adjacent located individual holders can be displaced with respect to the holder carriage and thus removed so far from the mounting component that the instruments which are located in the individual holders are no longer located ahead of the front side of the mounting component but at the side thereof so that, when desired, either suitable movement of the treatment chair or through suitable movement of the mounting component, there can be optimally reduced the distance between the front side of the mounting component and the mouth of the patient. Thereby, particularly when the mounting component is formed by a dental repository table, for example, a medication or instrument tray, it is advantageous that it is possible to optimally shorten the extent of the movements of the hands of the dentist or the assistant.

The previously mentioned advantageous effect can be further enhanced when the mentioned separate carrier, in its extended position, assumes a position which is pivoted with respect to the holder carriage or the lower carriage portion about a vertical axis, and in which the carrier is swung back with respect to the displacement direction. In addition thereto, there is also the following: Through the facilitated most extensive advance movement of the individual holders, the gripping of the instruments which are located in the individual holders or the depositing of the instruments in the individual holders can be rendered more difficult to the dentist, inasmuch as the instruments are located in a straight line in individual holders each of which is always more distant from the dentist. Through the now facilitated mentioned swinging back of the special carrier there is achieved that the special carrier, which includes the individual holders, extends at an obtuse angle relative to the front side of the mounting component, so that the dentist need in a predetermined manner with his hand to only traverse an arcuate gripping region in order to be able to remove the desired instrument from the applicable individual holder.

Hereby, inasmuch as the holder carriage can be displaced so as to be extendable from both sides out of the mounting component, and wherein also the carrier which includes the individual holders is supported on the holder carriage as to be displaceable towards both sides the equipment stand has all of the advantages thereof suitable for both right-handed as well as left-handed treating personnel.

BRIEF DESCRIPTION OF THE DRAWINGS

Reference may now be had to the following detailed description of preferred exemplary embodiments of the invention, taken in conjunction with the accompanying drawings; in which.

DETAILED DESCRIPTION

Figure 1:
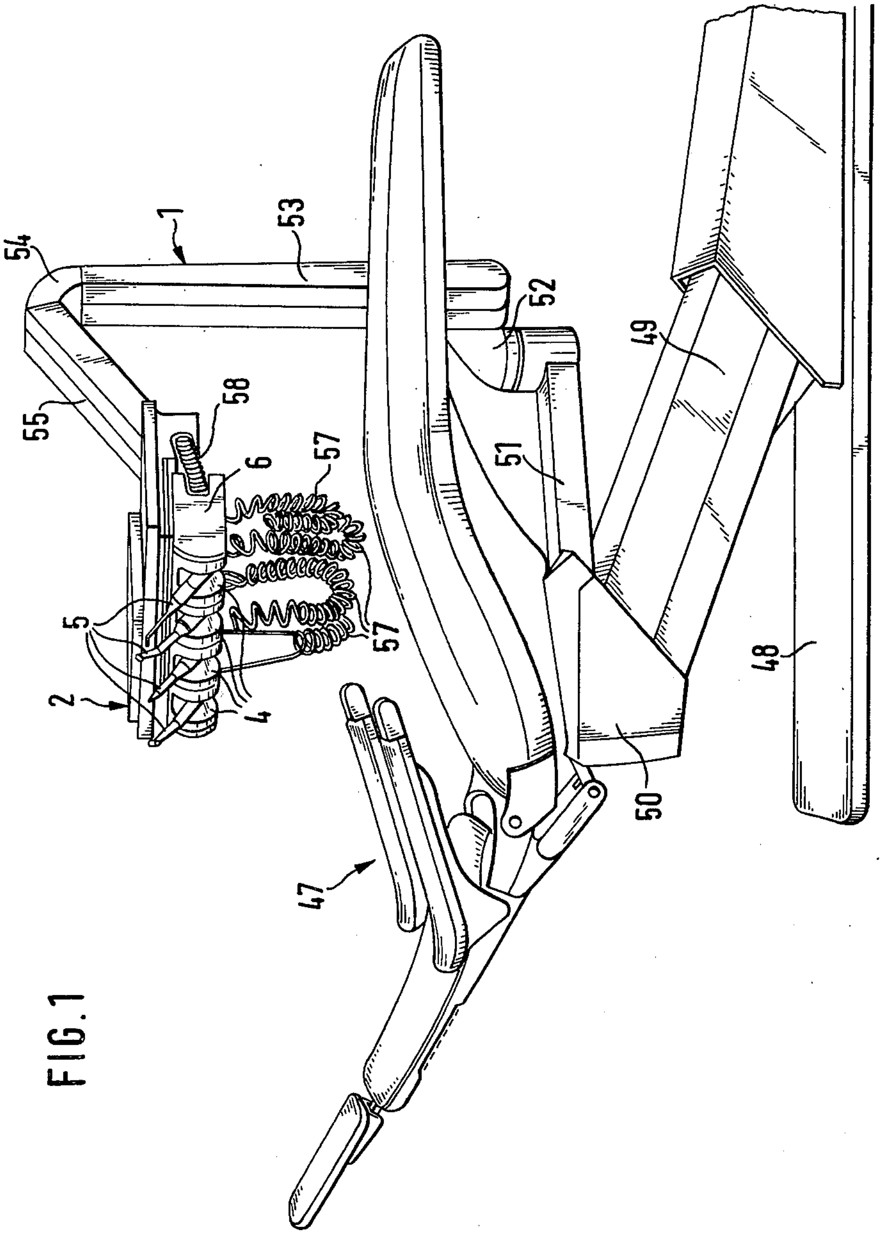
FIG. 1 illustrates a perspective view of a dental treatment chair combined with an equipment stand pursuant to the invention.

The equipment stand 1 which is combined with a dental treatment chair 47 consists of an equipment support 51 which is horizontally pivotably hinged the seat support 50 for the treatment chair 47, and to the free end of which there is hinged a swivel joint 52 so as to be swingable about a vertical axis. Hinged to this swivel joint 52 is a first pivot arm 53 which is pivotable about a horizontal axis, to the free end of which, through a joint 54, there is joined a second pivot arm 55 which is pivotable in a vertical plane. As can be ascertained from FIG. 2, at the end of the second pivot arm 55, with the aid of a joint 56, there is connected a mounting component 2 of the dental equipment stand 1 so as to be pivotable about a vertical axis. During a pivoting of the second pivot arm 55, the surface of the mounting component 2, which is construced as a dental repository table, remains continually horizontal.

The dental treatment chair 47 consists of a chair pedestal 48, a chair support 49 which is adjustable in height, and the previously-mentioned seat support 50 on which, in a suitable manner, there is arranged the seat with backrest.

Linearly horizontably displaceable on the mounting component 2 is a holder carriage 3 for the dental instruments 5 which are removably retained in the individual holders 4, and is thereby supported so as to be movable out of the side of the mounting component 2. The cooking utensil-like individual holders 4 are located on the side of the holder carriage 3 facing away from the mounting component 2, and in FIG. 1 facing towards the treatment chair 47 and therby towards the patient.

Figure 4:
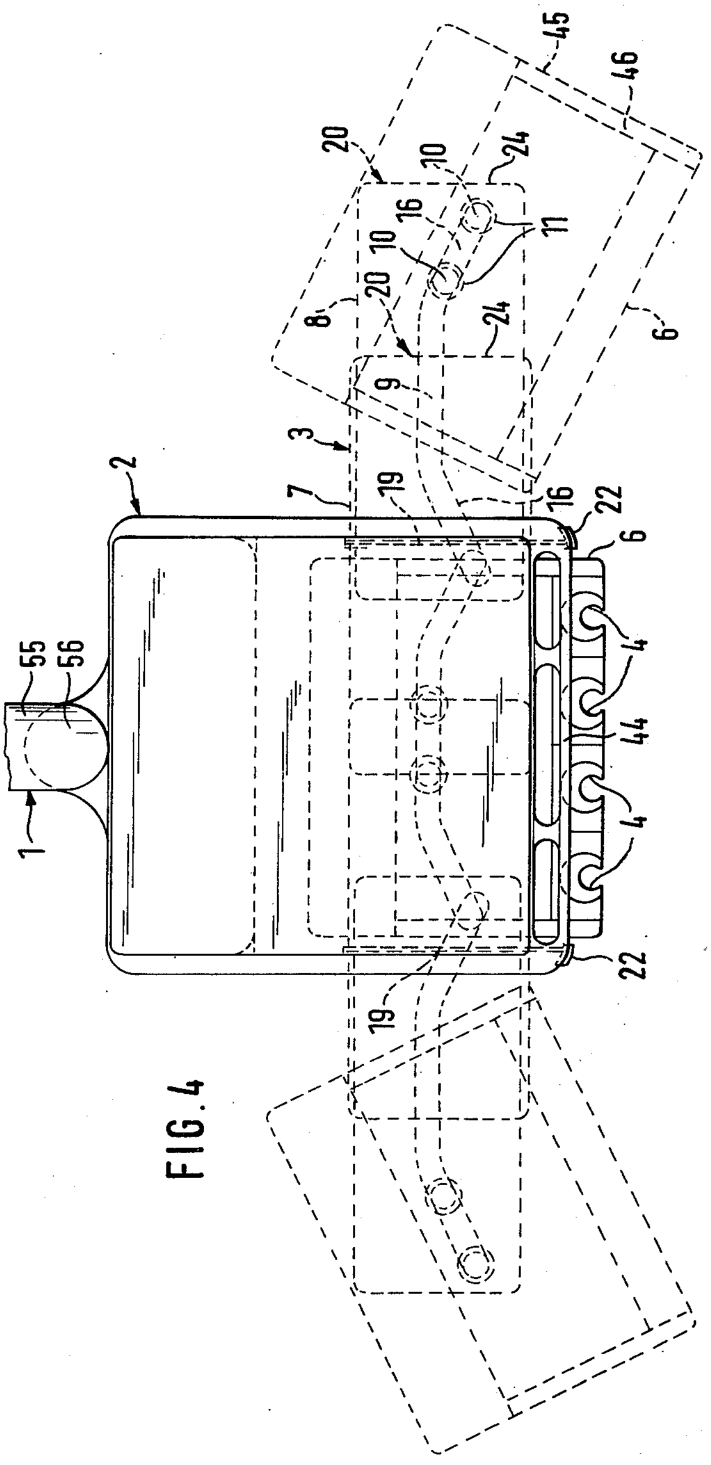
FIG. 4 illustrates the receiving component of FIG. 3 in a top plan view.
Figure 5:
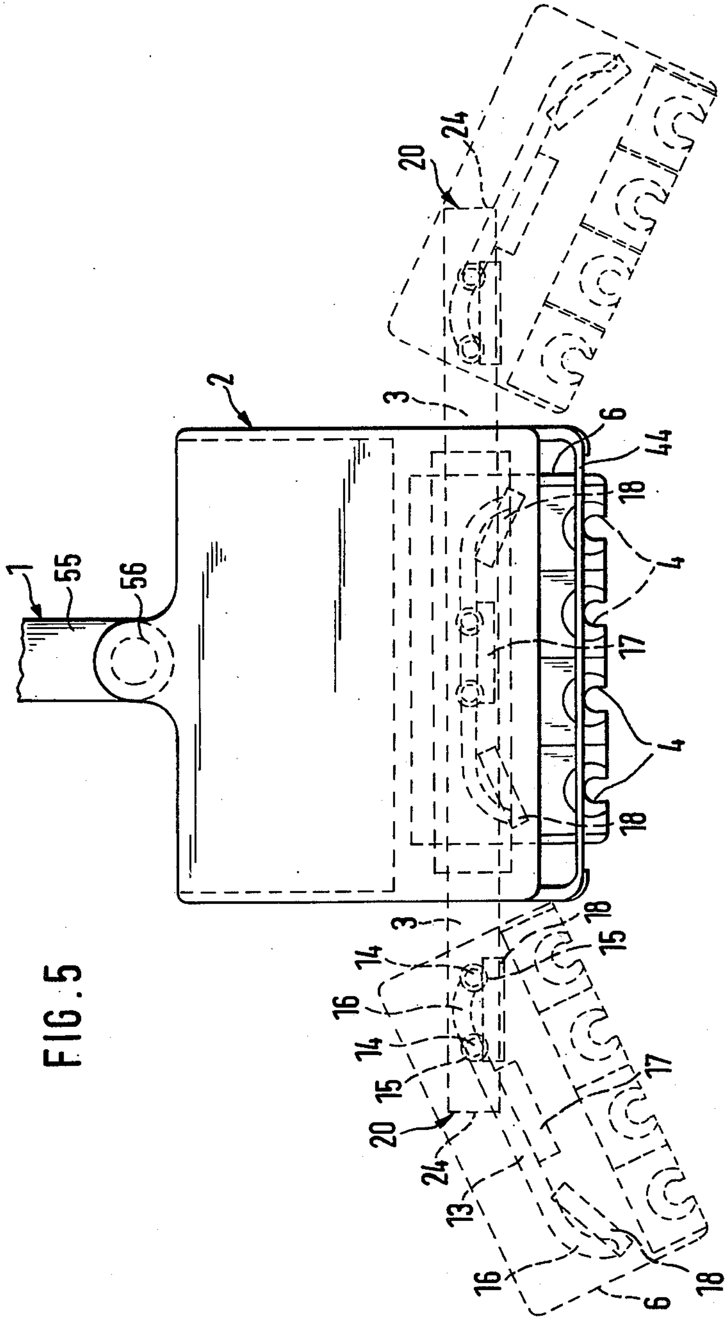
FIG. 5 illustrates a further embodiment of the support component in a top plan view, modified with respect to that in FIGS. 3 and 4.

Arranged on the holder carriage 3 is a carrier 6 which includes the individual holders 4, which is displaceable sideways opposite the holder carriage with regard to the displacement direction of the latter. The holder carriage 3 can be basically constructed as a unitary structure, as is illustrated in FIG. 5. However, as can be ascertained from the other figures, for example, especially from FIGS. 2 and 4, the holder carriage 3 can also consist of a plurality, in the illustrated instance consisting of two, superimposed carriage parts 7, 8 which are mutually slidably displaceable in the manner of a telescope, wherein the carrier 6 having the individual holders 4, is located on the lower carriage part 8. Facilitated thereby is a still more extensive moving away of the instruments 5 which are located in the individual holders 4 from the mounting component 2 and, accordingly, a still unhindered approach of the front side of the mounting components to the mouth of the patient.

The carrier 6 which includes the individual holders 4, in its extended position, assumes with respect to the holder carriage 3 or with respect to the lower carriage part 8, position which is pivoted about a perpendicular axis, in which the carrier 6 is swung back with respect to the sliding direction. This can be ascertained from FIG. 2, and also through the phantom-line representation shown in FIGS. 4 and 5. Furthermore, FIGS. 4 and 5 illustrate that the holder carriage 3 or the carriage parts 7, 8 can be displaceable towards both sides so as to project out of the mounting component 2; just as well is the carrier 6 supported as to be displaceable towards both sides on the holder carriage 3 or supported on the lower carriage part 8.

Figure 2:
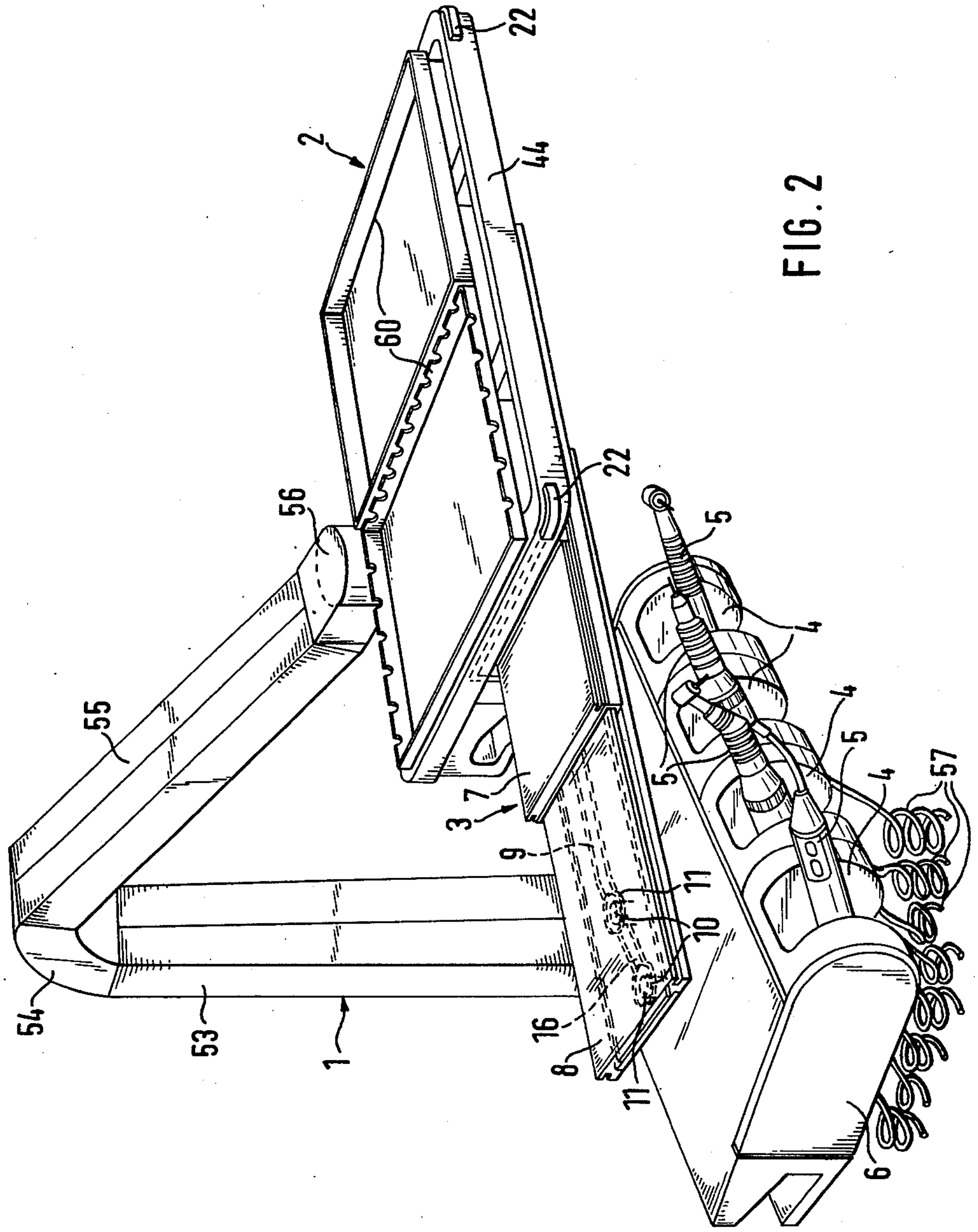
FIG. 2 illustrates an enlarged perspective view of the equipment stand pursuant to FIG. 1 without the treatment chair.
Figure 3:
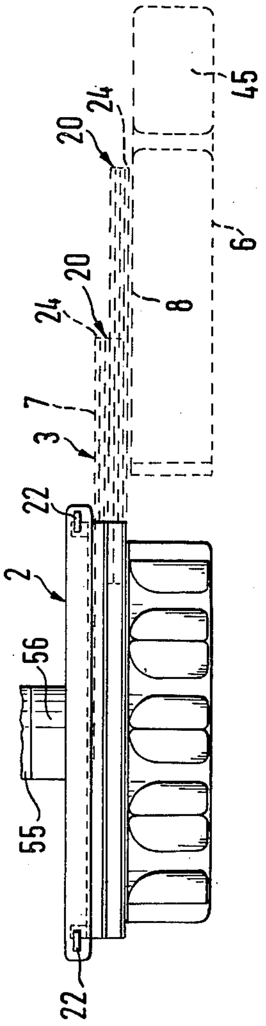
FIG. 3 is a front elevational view of the mounting component of the equipment stand.
Figure 6:
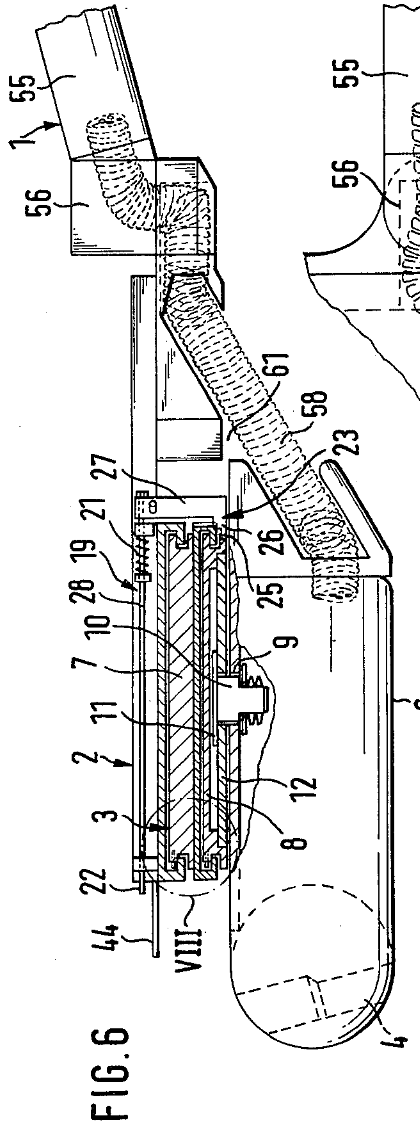
FIG. 6 illustrates a partly-sectioned enlarged representation of the mounting component pursuant to FIGS. 3 and 4.

In the embodiment pursuant to FIGS. 2 and 6, the holder carriage 3, or the lower carriage part 8, is provided with a downwardly opening guide slot 9 which is traversed by two pins 10 which are arranged on the upper side of the carrier 6. The pins 10 possess a widened portion 11 which engages beyond the upper edges of the guide slot 9 and, in this manner, serve for the connection with the holder carriage 3 or with the lower carriage part 8. A practical embodiment for the formation of the above connection is illustrated in FIG. 6. In accordance therewith, the lower side of the holder carriage 3 or the lower carriage part 8, while leaving a space for the widened portion 11 of the pin 10 is provided with a cover plate 12 which incorporates the guide slot 9.

In the embodiment pursuant to FIG. 5, the carrier 6 which includes the individual holders 4 is provided with an upwardly opening guide slot 13 which is traversed by two pins 14 which are arranged on the lower side of the holder carriage 3 or the lower carriage part 8. Also in this instance do the pins 14 possess a widened portion 15 which engages beneath the lower edges of the guide slot 13.

As can be ascertained, the guide slot 9 or 13 extends in the sliding displacement direction of the holder carriage 3, wherein at both slot ends there is formed an angled or bent slot extension 16 which, with respect to the displacement direction in the extended position of the carrier 6, facilitates its pivoted back position.

In the embodiment pursuant to FIG. 5, the pins 14 have latching elements 17 associated therewith for the clamping locking of the carrier which includes the individual holders 4 in the slid in position, and further latching elements 18 for the clamping locking of the carrier in the extended position with respect to the displaced direction with the entry of the pins into the guide slot extension 16 when in the swung back position. In the same manner, latching elements can be associated with the pins 10.

The latching elements 17, 18 are formed by blocks of elastic material, such as rubber or plastic, which are arranged on the carrier 6 so as to extend along the sides of the guide slot 9 or 13.

The holder carriage 3 or the lower carriage part 8 have releasable latching means, generally designated with 19, associated therewith, for the inserted position and for the extended position. The latching means 19 are formed by a latching stop 20 which is arranged on the holder carriage 3 or on the lower carriage part 8, as well as a cooperating latching stop 23 which, under the effect of a spring 21, is engageable with the latching stop 20, and by means of a handgrip 22 on the mounting component 2 is movable against the action of the spring 21 out of the above-mentioned engagement. The latching stop 20 for the inserted position is formed herein by the two end surfaces 24 of the holder carriage 3, or by the upper or the lower carriage parts 7 or 8. The latching stop 20 for the extended position consists of a latching recess 25. The cooperating latching stop 23, as is particularly illustrated in FIG. 6, is formed by a latching pin 26 which consists of the nose portion of a latching hook 27, and by means of a pressure rod 28, which is axially loaded by the spring 21 is supported in the mounting component 2. The pressure rod 28 hereby possess a pressure knob-like end which projects out of the mounting component 2 and forms the handgrip 22. The actuation of the latching pin 26 can also be effected pneumatically or electrically, in a manner not illustrated herein. At its one end, the pressure rod 28 includes the latching hook 27 and at its other end the handgrip 22, whereby it will extend transverse of the displacement direction and above beyond the holder carriage 3. The handgrip 22 is hereby located on that side of the mounting component 2 on which there are arranged the individual holders 4.

In order to prevent an excessive displacement, and to thereby prevent the detachment of the moving holder carriage 3 or the upper carriage part 7 from the mounting component 2, end stops 29 are arranged on the component 2 which, upon assumption of the extended end position of the holder carriage 3 or of the upper carriage part 7, will come into engagement with the cooperating end stop 30 on the holder carriage 3 or on the upper carriage part 7. As is ascertained from FIGS. 9 and 10, the end stops 29, which are formed as screws, project horizontally outwardly into a guide groove 31 for the holder carriage 3 or the upper carriage part 7, which is arranged in the mounting component 2; equally so, the cooperating end stops 30 which are formed as pins, extended horizontally from interiorly into the guide groove 31. Hereby, in an advantageous manner there is produced a low constructional height for the entire mounting component 2.

Figure 9:
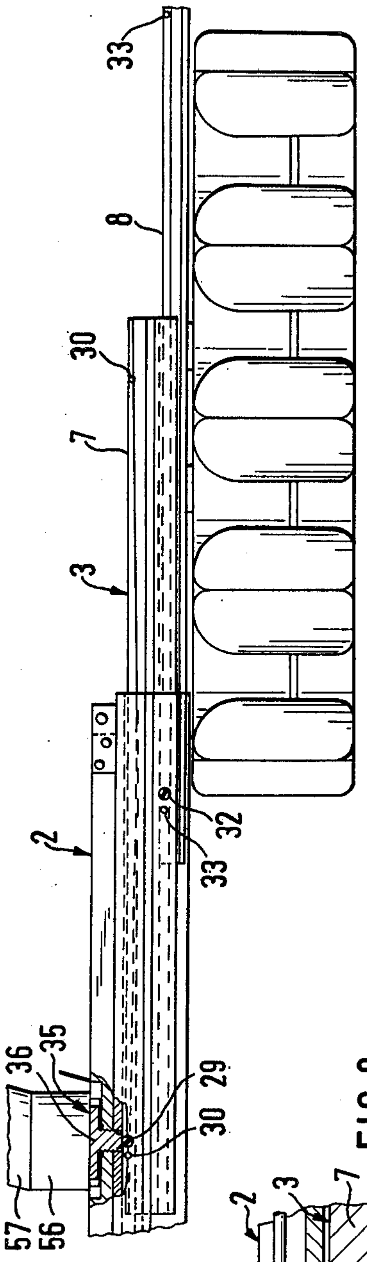
FIG. 9 illustrated a forward view of the right-half of the mounting component, shown in a front elevational view in an enlarged scale.
Figure 8:
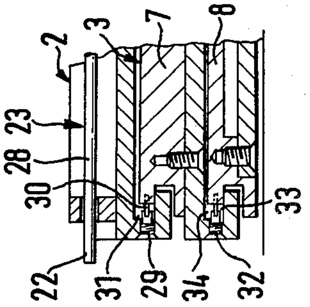
FIG. 8 illustrates on an enlarged scale the detail encircled in FIG. 6 and designated with VIII.
Figure 10:
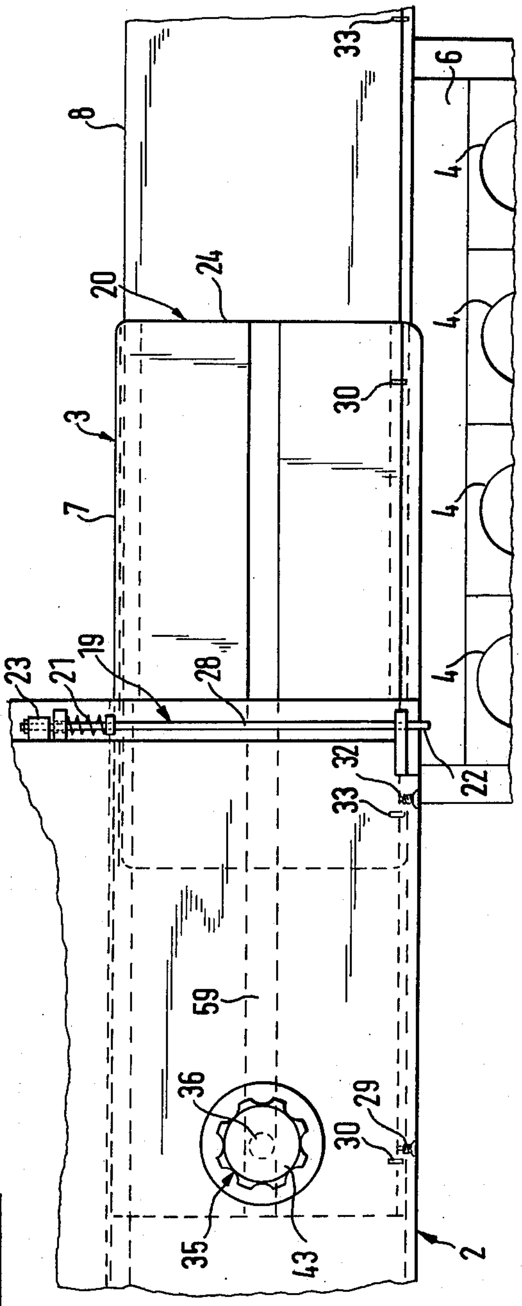
FIG. 10 illustrated a right-half of the mounting component pursuant for FIG. 9 in a top plan view.

As a result, there may be ascertained from FIGS. 9 and 10 that for the prevention of a detaching of the lower presently moving carriage part 8 from presently the upper carriage part 7, there are provided end stops 32 on the latter which, upon the assumption of the extended end position of presently the lower carriage part 8, come into engagement with further cooperating end stops 33 presently arranged on the lower carriage part. Also in this instance is the arrangement so designed that the further end stops 32 project from exteriorly into a further guide groove 32 on the upper carriage part 7 for the presently lower carriage part 8, into which further guide groove 34 there project inwardly the further cooperating end stops 33.

Figure 11:
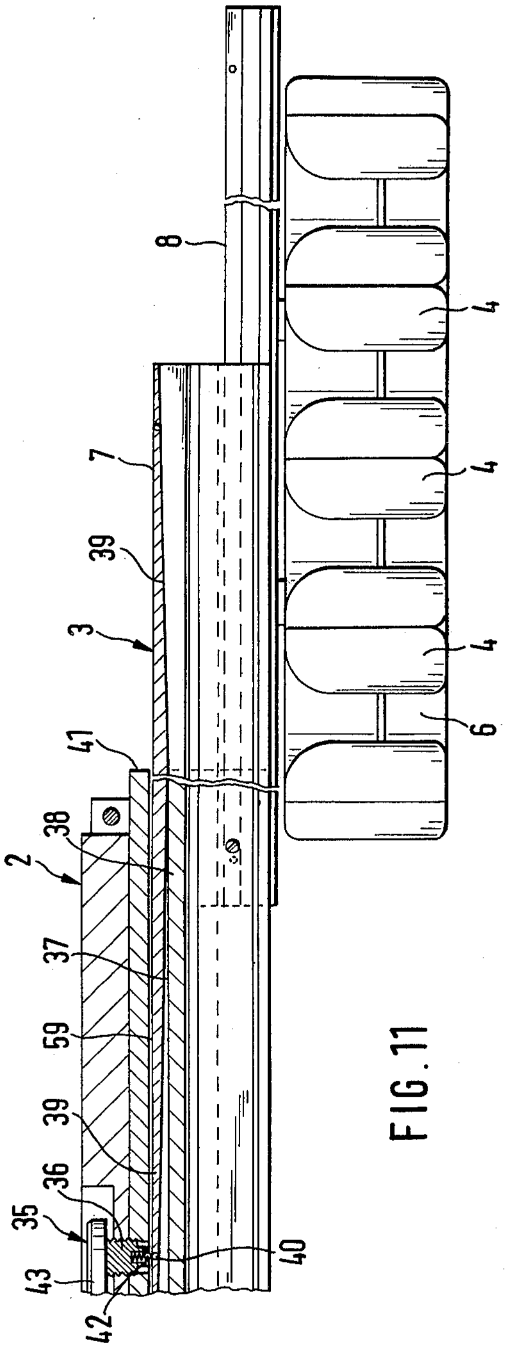
FIG. 11 illustrates the right-half of the mounting component pursuant to FIG. 9, shown partly in section.

As may be particularly ascertained from FIG. 11, in order to prevent any hanging down of the holder carriage 3 in the extended position on the mounting component 2, there is provided a level regulating device 35 which acts on the holder carriage 3 or on the upper carriage part 7. This level regulating device 35 consists of a pressure element 36 which will lie from above against the upper surface 59 of the holder carriage 3 or the upper carriage part 7, and which is located on the mounting component 2, wherein the holder carriage 3 or the upper carriage part 7 includes a downwardly directed inclined plane 39 which cooperates with the upper horizontal surface 37 of a contact rail 38 on the mounting component 2. This inclined plane 39, as illustrated in FIG. 11, extends in the displaced position from about the contact position 40 of the pressure element 36 up to the end surface 41 of the mounting component 2 in the displaced direction, and lies there against the contact rail 38.

From Fig. 11 there may further be ascertained that the horizontal surface 37 of the contact rail 38 of the mounting component 2 is oriented upwardly and the surface of the inclined plane 39 downwardly, wherein the pressure element 36 for contacting against the surface of the holder carriage 3 or the upper carriage part 7 is provided at its downwardly directed end with a resilient slide element 42, for example, a spring-loaded sphere. The pressure element 36 can be adjustable in a vertical direction in order to facilitate a correlation with the different loads of the extended holder carriage 3. The referred to displacement can be effected electrically, magnetically or pneumatically. Pressure element 36, however, as is illustrated in FIGS. 9 through 11, can also be formed by an adjusting screw which engages through the mounting component 2 from above, which includes above the mounting component a head shaped into a handgrip 43. For the actuation of the handgrip 43 there need only be removed the repository troughs 60 which are ascertainable in FIG. 2. In order to prevent the hanging down, the horizontal position of the extended holder carriage 3 is maintained practically through support of the surface of the holder carriage 3 or the upper carriage part 7 at the end surface 41 of the mounting component 2.

As is shown particularly in FIG. 2, the mounting component 2 is formed through a dental repository table. The mounting component 2 can also be formed, in a manner not illustrated herein, as part of a professional furniture piece, for example, a cabinet or writing desk.

The mounting component 2 possesses, on the side which includes the individual holders for a gripping wing 44 on which there is located the handgrip 22 of the cooperating latching stop 23.

In the embodiment pursuant to FIG. 4, provided on the end surface 45 of the carrier 6 which includes the individual holders 4 is a pull grip 46, for example, a gripping recess for pulling out of the carrier into its displaced direction.

In order to achieve a flat constructional height for the mounting component 2, it is also suitable that the holder carriage or carriage parts 7, 8 are formed in the shape of flat plates.

Figure 7:
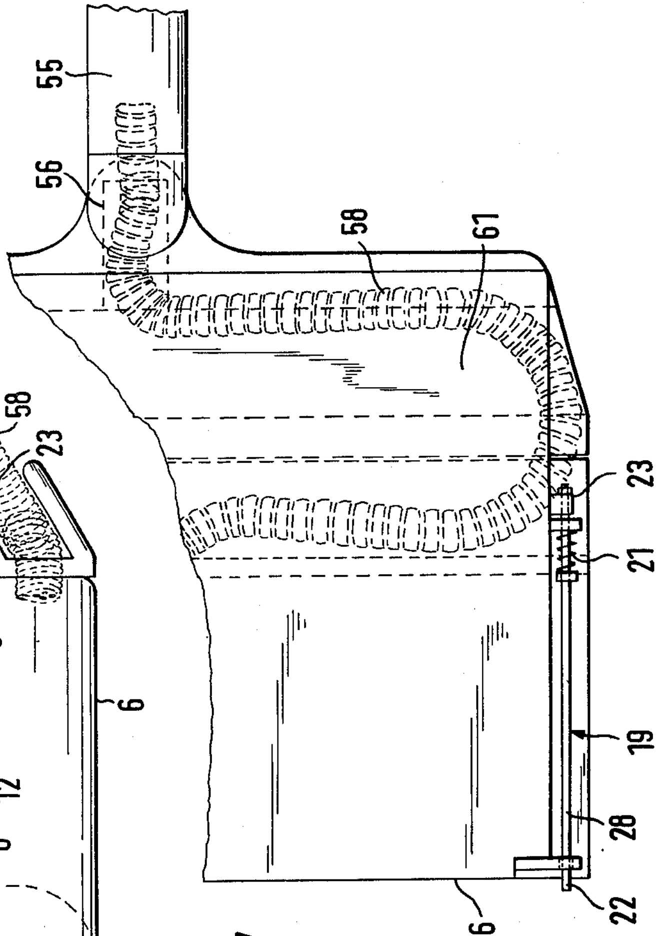
FIG. 7 is a top plan view of the mounting component pursuant to FIG. 6.

Located between the carrier 6 and the linkage 56, pursuant to FIGS. 6 and 7, is a flexible energy infeed hose 58, which is located in the components 49 through 56, at the rear side of the carrier being arranged within a recess 61 of the mounting component 2 so in the shape of a supply loop that it will not stand in the path of displacement of the carrier 6.

Leading to individual instruments 5 from the carrier 6 are individual flexible supply hoses 57 which extend from the energy infeed hose 58.

What is claimed is:

1. A dental equipment stand including a mounting component defining a dental repository table; a carrier for dental instruments which are withdrawably retained in individual holders in said carrier, said carrier being linearly horizontally displaceably supported below said dental repository table so as to be movable sideways away from said dental repository table to allow the instruments to be moved to one side to allow the dental repository table to be placed closely adjacent to the mouth of a patient; and a holder carriage coupled between and moveably supporting said carrier relative to said dental repository table, said holder carriage being linearly horizontally displaceably supported below said dental repository table, and said carrier being independently displaceable relative to said holder carriage, opposite the direction of displacement of said holder carriage.

2. Dental equipment stand as claimed in claim 1, said holder carriage comprising at least two superimposed mutually telescopically displaceable carriage parts, said carrier being arranged in the lowermost carriage part.

3. Dental equipment stand as claimed in claim 1 or 2, said carrier in the extended position thereof being pivoted about a vertical axis relative to said holder carriage, said carrier in said position being swung back relative to the displacement direction.

4. Dental equipment stand as claimed in claim 1, said holder carriage being slidable so as to be extendable from both sides of said mounting component.

5. Dental equipment stand as claimed in claim 1 or 2, said holder carriage including a downwardly opening guide slot; at least one pin on the upper surface of said carrier engaging in said slot, said pin having a widened portion engaging the upper edges of said guide slot.

6. Dental equipment stand as claimed in claim 5, a bottom cover plate having said guide slot therein located on the bottom side of said holder carriage, said bottom cover plate providing a space for the widened portion of said pin.

7. Dental equipment stand as claimed in claim 1 or 2, said carrier including an upwardly opening guide slot; at least one pin arranged on the bottom side of said holder carriage and engaging in said guide slot, said at least one pin including a widened portion engaging below the lower edges of said upwardly opening guide slot.

8. Dental equipment stand as claimed in claim 7, said guide slot extending in the direction of displacement of said holder carriage, said guide slot including an angled extension, with at least at one end of the angled extension facilitating the swung back position of said carrier relative to the displacement direction in the extended position.

9. Dental equipment stand as claimed in claim 8, comprising first latching elements associated with said pin for clampingly locking said carrier in the inserted position; and second latching elements for clampingly locking said carrier in the extended position under entry of said pin into the guide groove extension in the swung back position relative to said displacement direction.

10. Dental equipment stand as claimed in claim 1 or 2, comprising releasable latching means on said holder carriage for latching it in the inserted position and for latching it in the extended position.

11. Dental equipment stand as claimed in claim 1 or 2, comprising end stops on said mounting component for preventing the detaching of the movable holder carriage from said mounting component; and cooperating end stops on said holder carriage for engaging said end stops upon said holder carriage assuming its extended end position.

12. Dental equipment stand as claimed in claim 1 or 2, comprising level regulating means on said holder carriage for preventing said holder carriage from hanging down relative to the mounting component in the extended position of said carriage.

13. Dental equipment stand as claimed in claim 1, comprising a pull grip being located at the end surface of said carrier for pulling said carrier into the extended position thereof.

14. Dental equipment stand as claimed in claim 1 or 2, said holder carriage being formed by flat plates.

15. Dental equipment stand as claimed in claim 1, said carrier being supported on said holder carriage for displacement towards both sides thereof.

* * * * *